United States Patent
Furukawa

(10) Patent No.: US 6,327,420 B1
(45) Date of Patent: Dec. 4, 2001

(54) IMAGE DISPLAYING METHOD AND EDITING APPARATUS TO EFFICIENTLY EDIT RECORDED MATERIALS ON A MEDIUM

(75) Inventor: Takashi Furukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/344,081

(22) Filed: Jun. 25, 1999

Related U.S. Application Data

(63) Continuation of application No. PCT/JP98/04901, filed on Oct. 29, 1998.

(30) Foreign Application Priority Data

Oct. 29, 1997 (JP) .................................................. 9-297282

(51) Int. Cl.$^7$ ...................................................... H04N 5/92
(52) U.S. Cl. ............................ 386/52; 386/54; 345/716; 345/721; 345/722; 345/723
(58) Field of Search .................. 386/1, 33, 4, 45, 386/95, 68–70, 52, 55, 64, 54; 360/13; 369/83; 345/327, 328, 704, 716–726; H04N 5/76, 5/92, 9/79, 5/781

(56) References Cited

U.S. PATENT DOCUMENTS

| | | | |
|---|---|---|---|
| 4,685,003 | * 8/1987 | Westland | 386/52 |
| 5,737,552 | * 4/1998 | Lavallee et al. | 345/328 |
| 5,760,767 | * 6/1998 | Shore et al. | 345/328 |
| 5,877,781 | * 3/1999 | Tomizawa et al. | 386/52 |
| 5,956,453 | * 9/1999 | Yaegashi et al. | 386/52 |
| 5,963,204 | * 10/1999 | Ikeda et al. | 345/328 |

FOREIGN PATENT DOCUMENTS 0 555 028 A2 * 8/1993 (EP) .................................. G06F/15/72

* cited by examiner

*Primary Examiner*—Thai Tran
(74) *Attorney, Agent, or Firm*—Frommer Lawrence & Haug LLP; William S. Frommer; Joe H. Shallenburger

(57) ABSTRACT

At the start of editing, video clip icons of a temporally continuous video material are displayed in a window 31. When an icon 31-m is selected, a window 32 is opened in which icons of images are displayed at intervals of 15 seconds starting from the first frame of the selected video clip. When an icon 32-n is selected, a window 33 is opened in which icons of images at intervals of 15 frames are displayed in two equal portions before and after the icon 32-n for the display duration of each icon in the window 32. When an icon 33-q is selected, a window 34 is opened in which icons of continuous frame images are displayed in two equal portions before and after the icon 33-q for the display duration of each icon in the window 33. Because icons are displayed in a hierarchical manner, simply selecting appropriate icons successively allows the user to reach desired scenes in a rapid and an easy manner.

9 Claims, 11 Drawing Sheets

FIG. 5

IMAGE DISPLAYING METHOD AND EDITING APPARATUS TO EFFICIENTLY EDIT RECORDED MATERIALS ON A MEDIUM

This is a continuation of copending International Application PCT/JP98/04901 having an international filing date of Oct. 29, 1998.

TECHNICAL FIELD

The present invention relates to an image displaying method and an editing apparatus.

BACKGROUND ART

When materials recorded on tapes or discs are to be edited, an operation of apparatus for reproducing video and audio data from their storage medium are searched at a high-speed as a shuttle mode to detect the record position of a target scene. Further, the apparatus is put into a so-called jog mode illustratively for frame-by-frame reproduction whereby edit points (in- and out-points) are set. With desired scene thus acquired, the next desired scene is repeatedly detected likewise. In such editing operations, it is customary to use a single video monitor wherein the desired scene is verified using images displayed thereon.

Since a single scene is displayed in the process for detecting a desired scene in the shuttle or jog mode, reproducing position must be changed again and again in the shuttle or jog mode before the optimal scene is reached without keeping in mind which scene is stored on a position of either the tape or the disc. Thus, it takes time to carry out such editing work so that the editing work can not be done efficiently.

It is therefore an object of the present invention to provide an image displaying method and an editing apparatus whereby the optimal scene is reached easily so that recorded materials on the medium can be edited efficiently.

DISCLOSURE OF INVENTION

In carrying out the invention and according to one aspect thereof, there is provided an image displaying method comprising displaying one video clip or a plurality of video clips of temporally continuous material images on a screen as a first image group, displaying on the screen, when one of the video clips is selected from the first image group to request for a more detailed display of the selected video clip, image extracted at an interval of a first time period from the temporally continuous material images constituting the selected video clip as a second image group, displaying on the screen, when one image is selected from the second image group to request for a more detailed display of the selected image, image extracted at an interval of a second time period shorter than that of the first time period as a third image group, the image occurring over a time period before and after, before, or after the selected image within said second image group, then displaying on the screen, when one image is further selected from the image group displayed on the screen to request for a more detailed display of the selected image, image extracted relative to the selected image from the temporally continuous material images at an interval of a time period shorter than that of the image group including the selected image, and displaying on the screen, when one image is selected from an N-th image group to request for a more detailed image of the selected image, continuous material images occurring over a time period before and after, before, or after the selected image within the N-th image group.

According to another aspect of the invention, there is provided an editing apparatus comprising a data reproducing part for reproducing a temporally continuous material to acquire a reproduced signal, an editing part for performing editing process using the reproduced signal acquired by the data reproducing part and for creating reduced image of the material, a display device for displaying a plurality of reduced images of the material created by the editing part, an inputting part for selecting any one of said reduced images displayed on a screen of the display device, and a controlling part for controlling the data reproducing part and the editing part, when any one of the images currently displayed on the display device is selected by the inputting part to request for a more detailed display of the selected image, to allow the display device to display reduced images of the image extracted relative to the selected image from the temporally continuous material at intervals of a time period shorter than that of the reduced images displayed currently on the display. In one preferred structure of the invention, the editing apparatus may further comprise a video monitor, wherein, when the image displayed on the display screen is selected by the inputting part, the controlling part controls the data reproducing part and the editing part to allow video monitor to display the selected material image in a nonreduced format on the screen thereof. Further, in another preferred structure of the invention, the editing apparatus may further comprise an audio outputting part, wherein, when the image displayed on the display screen is selected by the inputting part, the controlling part controls the data reproducing part and the editing part to allow the audio outputting part to output audio data corresponding to the selected image therefrom for a predetermined period of time.

According to the invention, when a temporally continuous material is to be edited, one or a plurality of video clips of images representing the material are displayed. When one of the displayed video clips is selected to request for a more detailed display of the selected clip, reduced images are displayed after being extracted from the temporally continuous material at intervals of a time period shorter than that of the displayed reduced images. When one of the images on display device is further selected for a more detailed display of the selected image, a plurality of reduced images are displayed relative to the selected image at an interval of time period shorter than that of the former. Thus, the process above may select desired images from any positions in the temporally continuous material.

BRIEF DESCRIPTION OF DRAWINGS

FIG. 5 is a schematic view showing frame icons in detail;

BEST MODE FOR CARRYING OUT THE INVENTION

Figure 1:
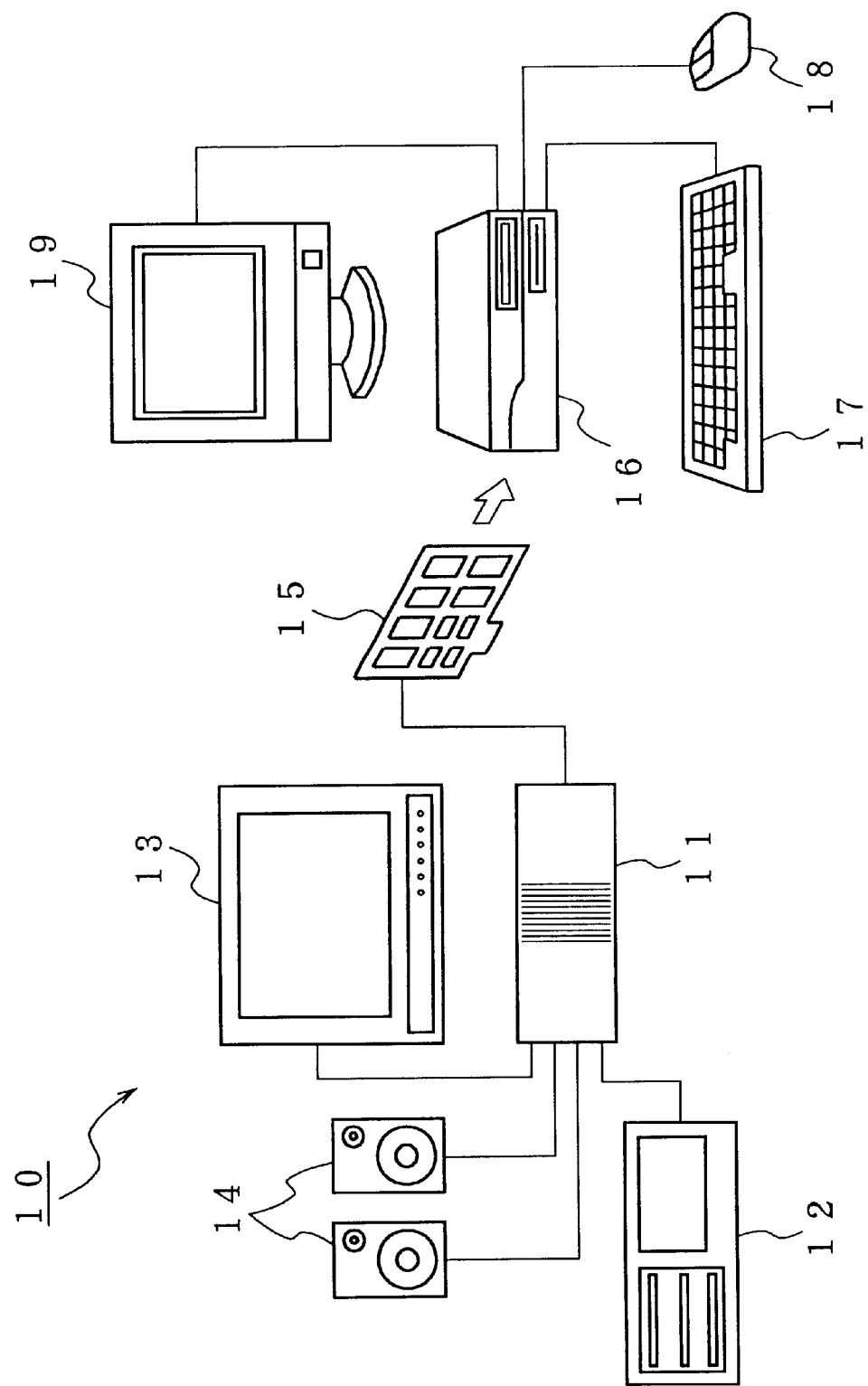
FIG. 1 is a schematic view showing a configuration of an editing apparatus embodying the invention.

FIG. 1 shows a configuration of an editing apparatus 10 for editing video materials. The editing apparatus 10 has at its core an editing part 11 having functions of a switcher, an effecter, a mixer and so on. The editing part 11 is connected to a data reproducing part 12, a video monitor 13 and speakers 14 among others. The editing part 11 conducts editing processes using video and audio data retrieved by the data reproducing part 12. Images being edited are displayed on a screen of the video monitor 13 and audio data being edited is outputted from the speakers 14. The data reproducing part 12 may be a disc reproducing device such as a fixed disc drive or a removable storage medium capable of reproducing optical discs, for example. Images and audio data copied from video tapes or like medium and recorded on fixed discs, or images and audio data recorded on optical discs are retrieved therefrom and sent to the editing part 11.

The editing part 11 is connected via an interface board 15 to a computer 16 constituting a controlling part. The computer 16 controls the operations of the editing part 11. The interface board 15 is incorporated in the computer 16.

The computer 16 is connected to a keyboard 17 and a mouse 18 constituting an inputting part, as well as to a display device 19. Icons or like images displayed on a screen of the display device 19 may be operated on and selected illustratively by use of the mouse 18. In accordance with such operations of the inputting part, the operations of editing part 11 are controlled so that editing processes in a GUI (graphic user interface) environment may be executed.

Figure 2:
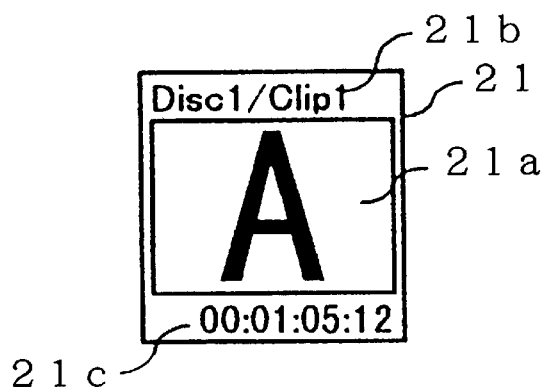
FIG. 2 is a schematic view depicting a clip icon.

Editing operations will now be described. The screen of the display device 19 connected to the computer 19 displays an icon 21 of a video clip (a temporally continuous video material) as shown in FIG. 2. The video clip icon 21 has at its center 21a a reduced image representing the contents of the video clip, such as a reduced image of the first frame of the video clip in question. In an upper part 21b of the image is a clip name (e.g., "Clip 1"). A time code of the first frame is shown in a lower part 21c of the image. Illustratively, a time code "00:01:05:12" signifies 0 hour, 1 minute, 5 seconds, frame 12. When the data reproducing part 12 is a disc reproducing device capable of reproducing data from a removable storage medium such as an optical disc, the upper part 21b may also display a disc name (e.g., "Disc 1").

Figure 3:
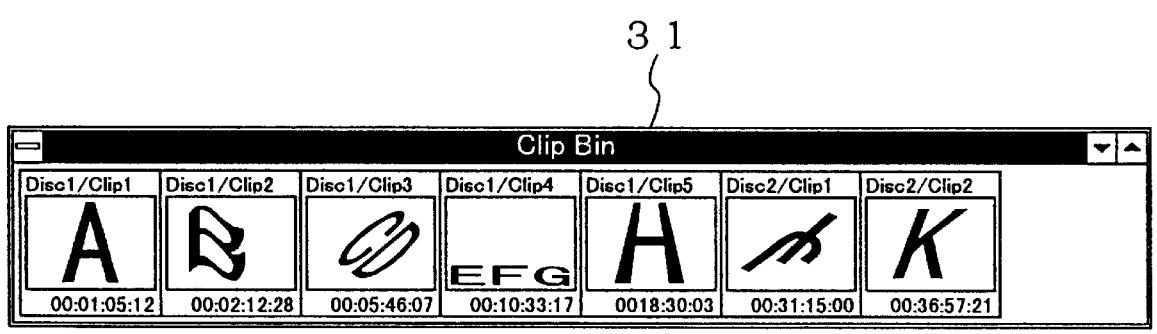
FIG. 3 is a schematic view illustrating how clip icons are displayed.

When the editing apparatus 10 is started in operation, a window 31 for displaying clip icons as shown in FIG. 3 (titled "Clip Bin" in this example) is opened on the screen of the display device 19: When the data reproducing part 12 recognizes a disc loaded therein, clip icons are created successively on the basis of data retrieved from the disc. The icons thus created are pasted as a first image group in the "Clip Bin" window 31. When the current disc is replaced by a second disc in the data reproducing apparatus 12, clip icons are created in like manner and are pasted also in the "Clip Bin" window 31. These processes are performed automatically.

Figure 4:
FIG. 4 is a schematic view indicating how frame icons are displayed.

When an editor selects a desired clip icon and double-clicked on the button of the mouse 18, the action is interpreted as a request for a more detailed display of images associated with the selected icon. For example, selecting and double-clicking on a clip icon 31-m titled "Disc 1/Clip 4" with a time code "00:10:33:17" opens a new window 32 titled "Disc 1/Clip 4—Interval: 15 seconds" as shown in FIG. 4. Image data are read from the disc, representing frame images at intervals of 15 seconds starting from the first frame (with a time code "00:10:33:17") of the video clip in question. Also read from the disc are image data of the last frame. A reduced image of the icon "Disc 1/Clip 4", reduced images of the frames extracted at intervals of 15 seconds starting from the first frame, and a reduced image of the last frame of the video clip are arranged successively as a second image group made of frame icons in the window 32. This arrangement allows the editor easily to grasp the material contents of the video clip from the first to the last frame. Each of the frame icons in the window 32 indicates a reduced image and a time code, and so does each of the frame icons to be discussed below.

When a new window 32 is displayed, the window 32 is regarded as the currently selected window while the "Clip Bin" window 31 is considered a nonselected window. In such a case, the window 32 is highlighted for its selected status (e.g., white title characters on black screen) whereas the "Clip Bin" window 31 is given a nonselected status indication (e.g., title inverted, providing black title characters on white screen). The selected clip icon 31-m in the "Clip Bin" window 31 is highlighted for its detailed display status (e.g., outer frame shown black), and frame icon 32-1 in the window 32, which has the same image as the clip icon 31-m, is given a selected icon indication (e.g., outer frame in thick lines).

Figure 5:
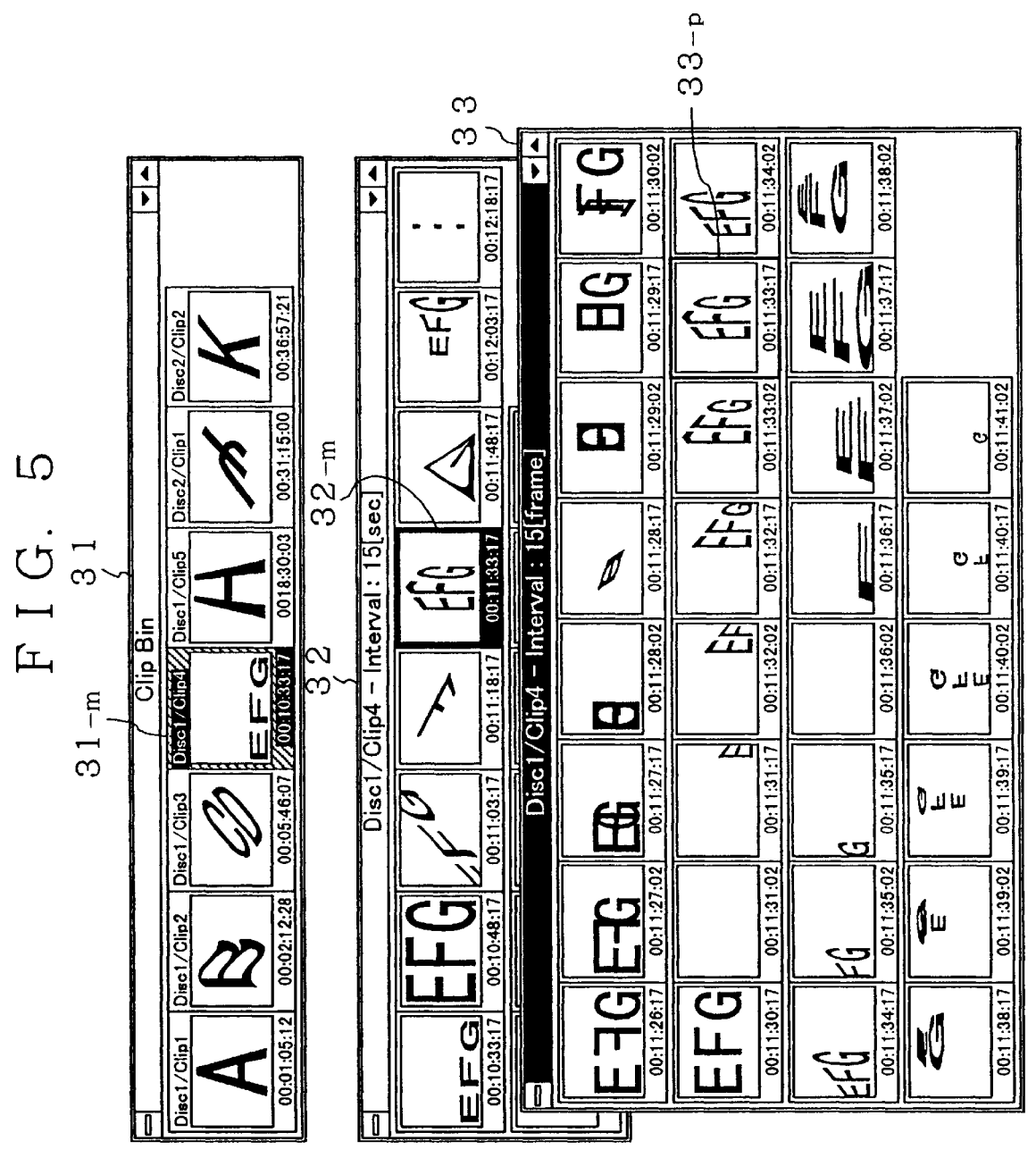

When the editor selects from the window 32 a desired frame icon and double-clicks on the button of the mouse 18, the action is interpreted as a request for a more detailed display of images associated with the selected icon. For example, selecting and double-clicking on the frame icon with a time code "00:11:33:17" opens a new window 33 titled "Disc 1/Clip 4—Interval: 15 frames" as shown in FIG. 5. Image data are read from the disc at intervals of 15 frames, representing frame images for the display duration of each frame icon in the window 32 (i.e., 30 frames for 15 seconds) in two equal portions before and after the selected frame icon 32-n. A reduced image identical to that of the frame icon 32-n, as well as reduced images of the retrieved frames are regarded as frame icons and pasted in the window 33 as a third image group. Specifically, 30 frames of reduced images for 15 seconds ranging in time code from "00:11:26:17", "00:11:27:02" to "00:11:41:02" are pasted as frame icons in two equal portions before and after the frame with the time code "00:11:33:17."

When a new window 33 is displayed, the window 33 is regarded as the currently selected window while the "Clip Bin" window 31 and the window 32 are considered nonselected windows. In that case, the window 33 is highlighted for its selected status while the "Clip Bin" window 31 and the window 32 are given nonselected status indications. The selected frame icon 32-n in the window 32 is highlighted for its detailed display status (e.g., outer frame shown black), and frame icon 33-p in the window 33, which has the same image as the frame icon 32-n, is given a selected icon indication (e.g., outer frame in thick lines). The clip icon 31-m in the "Clip Bin" window 31 is indicated as the window selected in the preceding step (e.g., outer frame region shaded)

Figure 6:
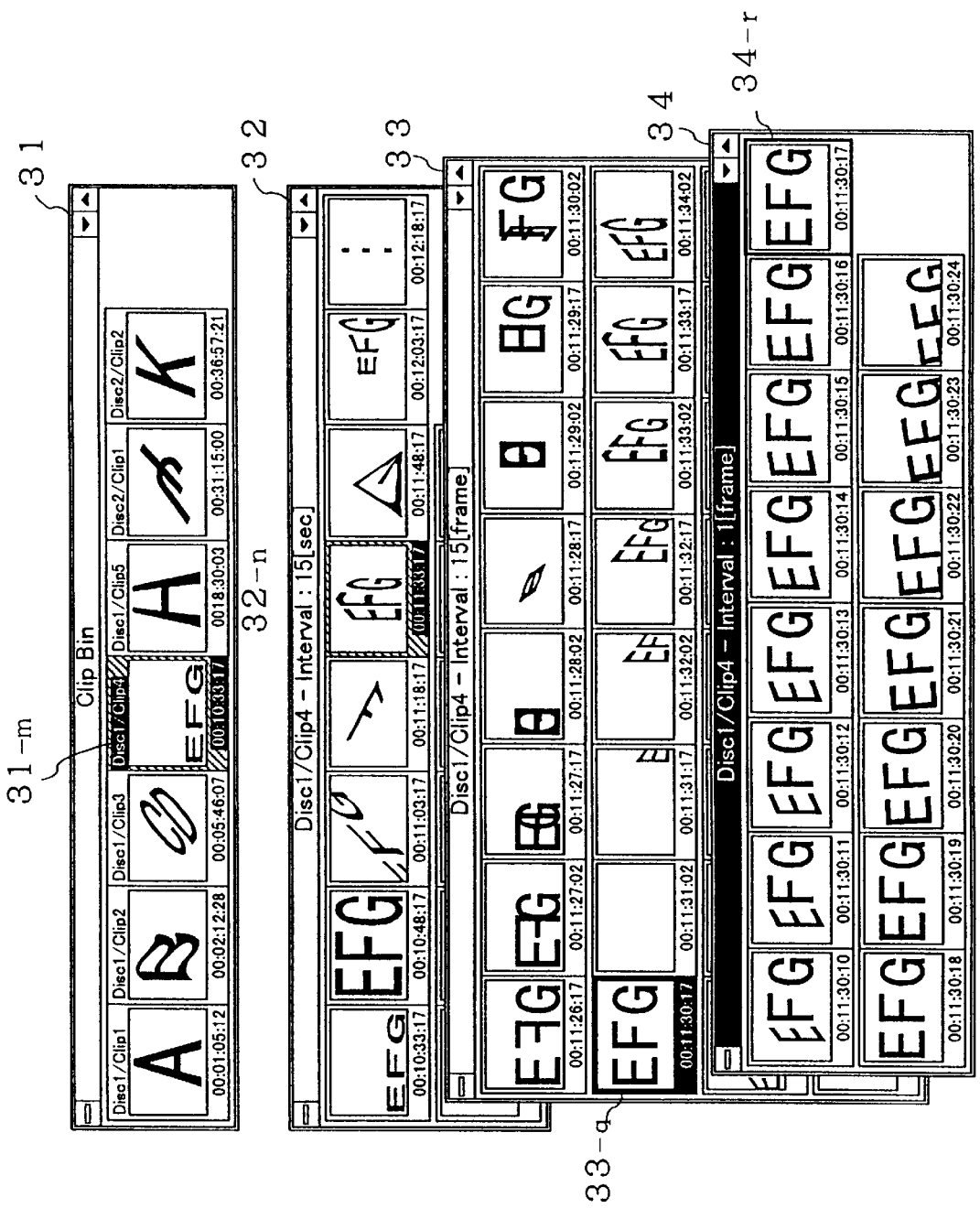
FIG. 6 is a schematic view depicting frame icons in more detail.

When the editor selects from the window 33 a desired frame icon and double-clicks on the button of the mouse 18, the action is interpreted as a request for a more detailed display of images associated with the selected frame icon. For example, selecting and double-clicking on a frame icon with a time code "00:11:30:17" opens a new window 34 titled "Disc 1/Clip 4—Interval: 1 frame" as shown in FIG. 6. Image data are read from the disc, representing frame images at intervals of a frame for the display duration of each frame icon in the window 33 (i.e., 15 frames) in two equal portions before and after the selected frame icon 33-q. A reduced image identical to that of the frame icon 33-q, as well as reduced images of the retrieved frames are regarded as frame icons and pasted in the window 34. Specifically, 15 frames of reduced images ranging in time code from "00:11:30:10", "00:11:30:11" to "100:11:30:24" are pasted as frame icons in two equal portions before and after the frame with the time code "00:11:30:17."

When a new window 34 is displayed, the window 34 is regarded as the currently selected window while the "Clip Bin" window 31, window 32 and window 33 are considered nonselected windows. In that case, the window 34 is highlighted for its selected status whereas the "Clip Bin" window 31, window 32 and window 33 are given nonselected status indications. The selected frame icon 33-q in the window 33 is highlighted for its detailed display status, and frame icon 34-r in the window 34, which has the same image as the frame icon 33-q, is given a selected icon indication. The clip icon 31-m in the "Clip Bin" window 31 and the frame icon 32-n in the window 32 are indicated as the windows selected in the previous steps.

As described, windows are displayed in a hierarchical structure that allows the editor to select clip icons and frame icons one after another in the successively displayed windows. Desired scenes are thus reached easily and quickly by simply requesting a more detailed display of each selected clip icon or frame icon.

When a clip icon or a frame icon is selected, audio data may be read from the first frame or from a frame region centering on the selected frame icon, and the retrieved audio data may be output from the speakers 14. This permits a search for desired scenes by use of sound. If a new icon is selected halfway during sound reproduction, the current reproduction process is immediately terminated so that the sound corresponding to the newly selected icon is reproduced instead. With no further detailed display deemed necessary, it may be desired to display a target image on the screen of the video monitor 13. When the audio data is outputted for a predetermined period of time, both image display and sound output maybe effected by moving the mouse cursor to the relevant icon and by single-clicking on that icon.

Where a disc reproducing apparatus is used as the data reproducing part 12, the apparatus maybe arranged to create video clips automatically whenever a new disc is loaded. The disc reproducing apparatus may also be arranged to perform automatically a detailed display of a clip icon or images associated with that clip icon or with other video clips at intervals of a predetermined period.

Figure 7:
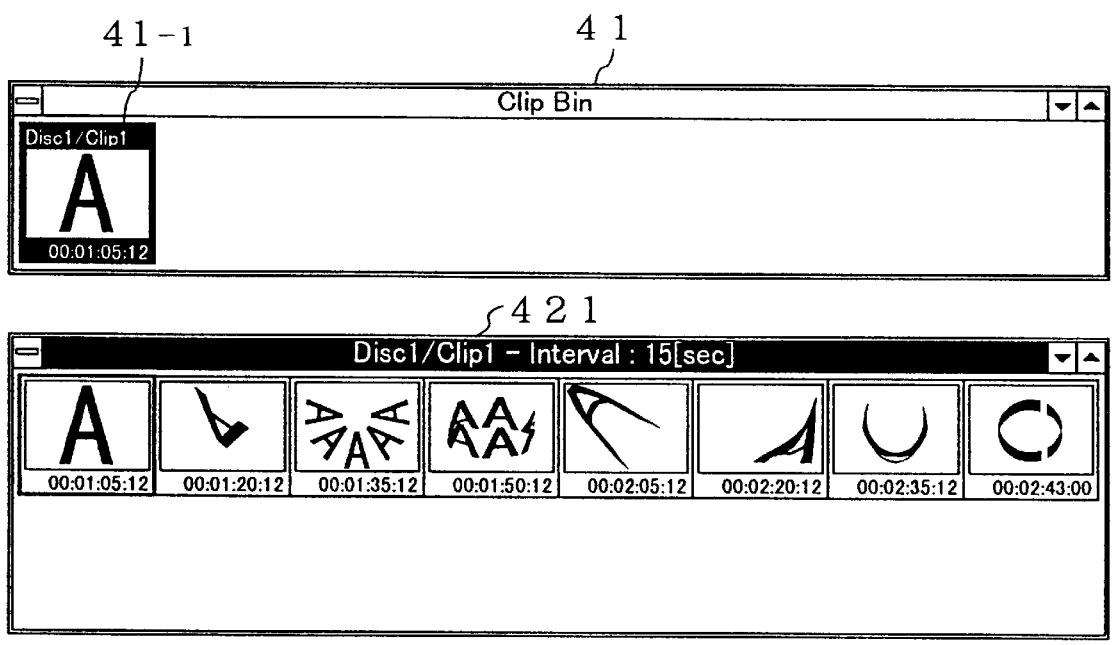
FIG. 7 is a schematic view illustrating how clip icons are automatically displayed.

When two discs are loaded illustratively in the data reproducing part 12, a first clip icon 41-1 is pasted in an already opened "Clip Bin" window 41 as shown in FIG. 7. Where a display interval of 15 seconds is set for example, a window 42-1 titled "Disc 1/Clip 1—Interval: 15 seconds" is opened automatically. Image data representing frame images are read from the disc at intervals of 15 seconds starting from the frame position of the clip icon 41-1. A reduced image identical to that of the frame icon 41-1 and reduced images of the retrieved frames are then pasted as frame icons in a window 421.

Figure 8:
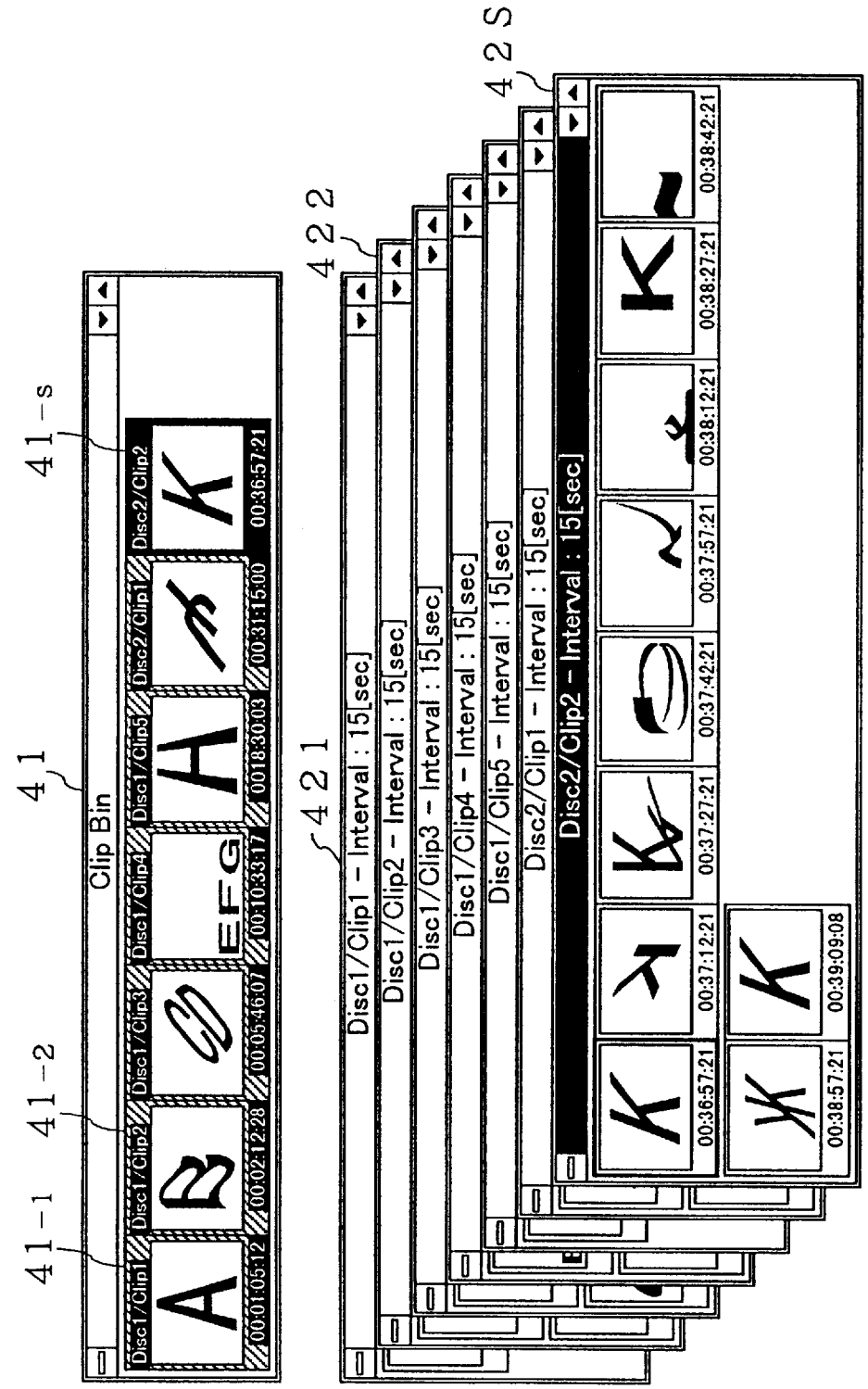
FIG. 8 is a schematic view picturing how frame icons are automatically displayed with respect to each clip icon.

A second clip icon 41-2 is then pasted in the "Clip Bin" window 41 as shown in FIG. 8. At the same time, a window 422 titled "Disc 1/Clip 2—Interval: 15 seconds" is opened automatically. Image data representing frame images are read from the disc at intervals of 15 seconds starting from the frame position of the clip icon 41-2. Concurrently, image data representing the last frame of the images associated with the clip icon 41-2 are read from the disc. A reduced image identical to that of the frame icon 41-2, reduced images of the retrieved frames, and a reduced image of the last frame are then pasted as frame icons in a window 422. The processing is continued in like manner. When the last clip icon 41-S is pasted in the "Clip Bin" window 41, a window 42S titled "Disc 2/Clip S—Interval: 15 seconds" is opened automatically. Image data representing frame images are read from the disc at intervals of 15 seconds starting from the frame position of the clip icon 41-S. At the same time, image data representing the last frame of the images associated with the clip icon 41-S are read from the disc. A reduced image identical to that of the clip icon 41-S, reduced images of the retrieved frames, and a reduced image of the last frame are then pasted as frame icons in a window 42S.

As described, clip icons and images associated therewith are displayed as frame icons at intervals of, say, 15 seconds on the screen of the display device 19. This allows the editor to grasp the materials recorded on discs and the contents of these materials in a quick and an easy manner, whereby editing work is carried out in an efficient, time-saving manner.

To execute the above editing process, the operations as shown in the flowcharts of FIGS. 9 through 13 are done in the editing part, the data reproducing part and the computer. It is assumed here that a disc reproducing device is used as the data reproducing part whereby video clips are created automatically and whereby the operation that sound corresponding to each clip icon or frame icon is output, is executed upon selection thereof.

Figure 9:
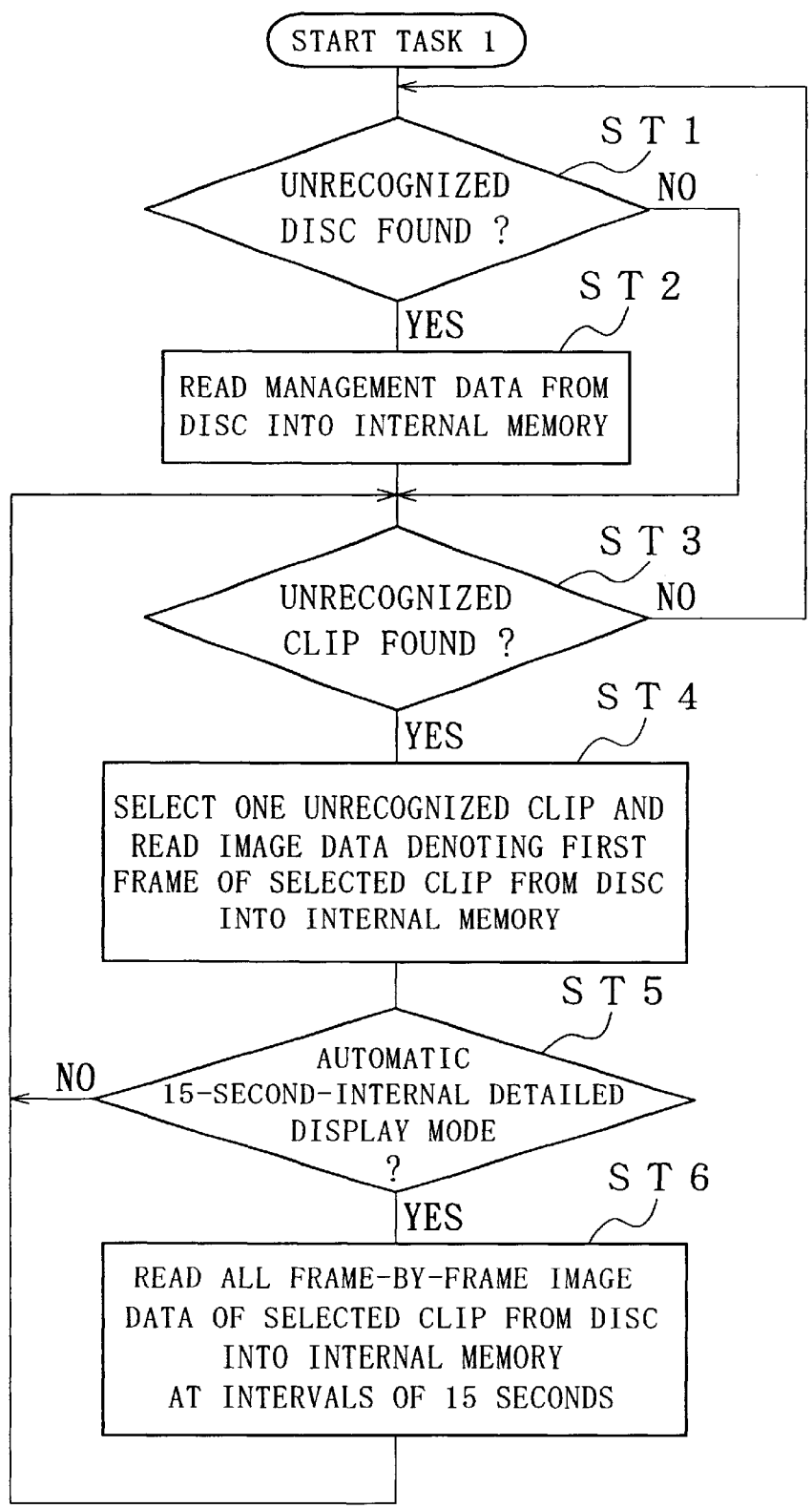
FIG. 9 is a flowchart of steps representing operations (task 1) of a data reproducing part 12.
Figure 10:
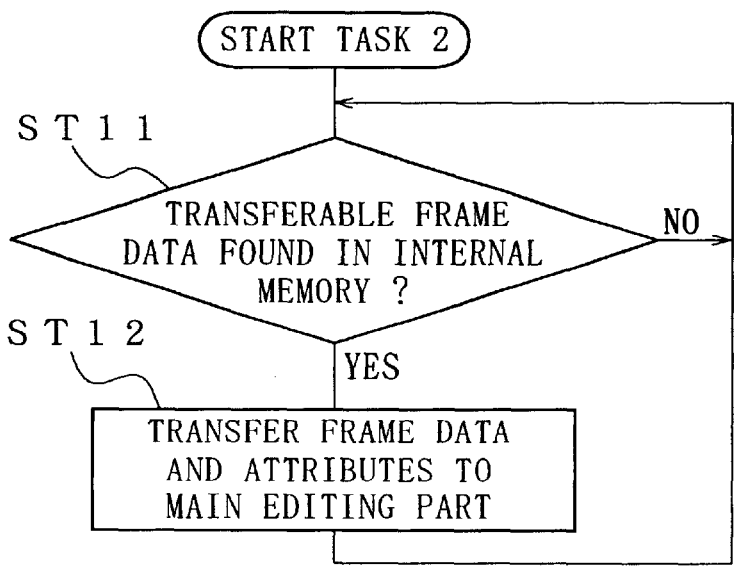
FIG. 10 is a flowchart of steps denoting operations (task 2) of the data reproducing part 12.
Figure 11:
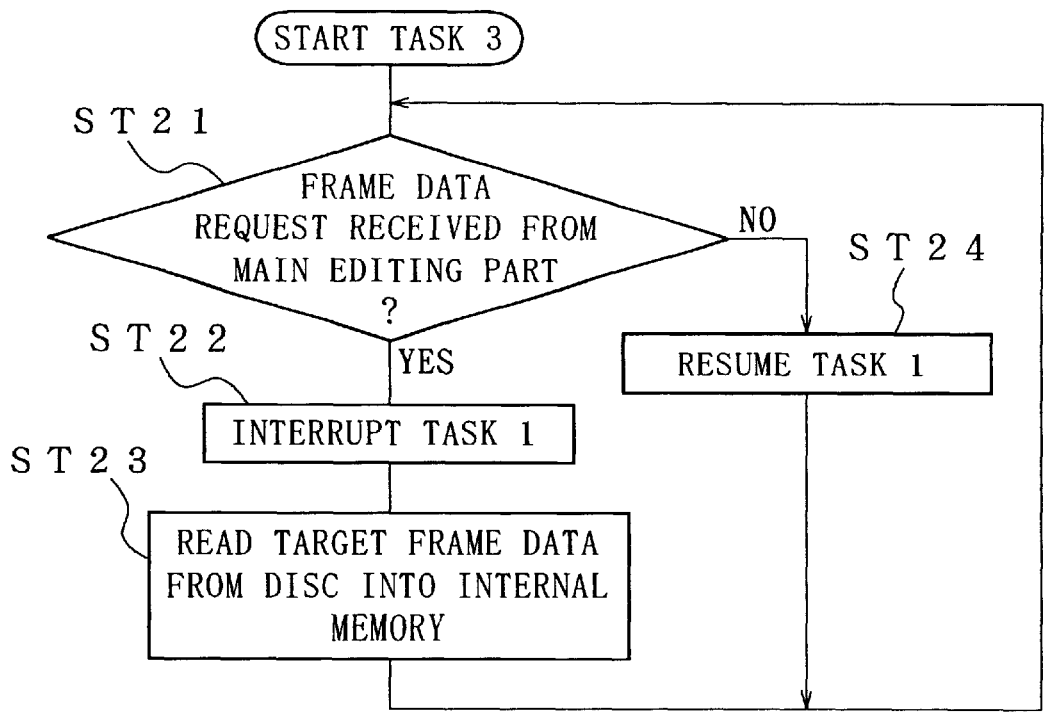
FIG. 11 is a flowchart of steps indicating operations (task 3) of the data reproducing part 12.

FIGS. 9 through 11 indicate tasks to be carried out by the data reproducing part 12. In step ST1 of FIG. 9 depicting a task 1, a check is made to see if there is any disc yet to be recognized by the data reproducing part 12. If such a disc (e.g., a newly loaded disc) is found to exist, step ST2 is reached. If there is no such disc, step ST3 is reached.

In step ST2, management data indicating how the data are recorded on the disc and so on are read from the disc. The retrieved management data are stored into an internal memory of the data reproducing part 12. Step ST2 is followed by step ST3.

In step ST3, a check is made to see if there is any video clip yet to be recognized. If no such video clip is found to exist, step ST1 is reached again. If such a video clip is found to exist, step ST4 is reached.

In step ST4, one video clip that has not yet recognized is selected. Image data representing the first frame of the video clip are read from the disc and stored in the internal memory of the data reproducing part 12. Step ST4 is followed by step ST5.

In step ST5, a check is made to see if a detailed display is to be made automatically. If detailed images are displayed illustratively at intervals of 15 seconds, step ST6 is reached. If a detailed display is not made automatically, the step ST3 is reached again.

In step ST6, image data representing frame images are read from the disc at intervals of 15 seconds starting from the start frame of the video clip selected in step ST4. The retrieved image data are stored in the internal memory, and step ST3 is reached again.

In the task 1, as described, the image data associated with each video clip that has not yet recognized are read and stored in the internal memory of the data reproducing part 12.

In a task 2 shown in FIG. 10, a check is made in step ST11 to see if image data have been stored in units of a frame in the internal memory of the data reproducing part 12. If the image data are not found in the internal memory, step ST11 is reached again. If the image data are found to be stored, the image data representing frame images are sent together with time codes to the editing part 11. If the image data to be transferred to the editing part 11 represent the first frame of the video clip in question, the clip name is transferred along with the image data and time code and step ST11 is reached again.

In the task 2, as described, the internal memory of the data reproducing part 12 is checked for the presence of image data stored in units of a frame. When the image data are found to exist, the data and their attribute information such as time codes are automatically sent to the editing part 11.

In a task 3 shown in FIG. 11, a check is made in step ST21 to see if the editing part 11 has made a request for the transfer of image data representing frame images. If such a request is made by the editing part 11, step ST22 is reached. If no such request has been made, step ST24 is reached.

In step ST22, the task 1 described above is interrupted. Step ST22 is followed by step ST23 in which the requested image data are read from the disc and written to the internal memory. Then step ST21 is reached again. When the image data are written to the internal memory, the editing part 11 is supplied with the image data and their attribute information through the processing of the task 2. In step ST23, the editing part 11 is fed with the requested image data together with the retrieved audio data corresponding to the image data.

If no request is found in step ST21, step ST24 is reached. In step ST24, the task 1 interrupted in step ST22 is resumed. Step ST24 is followed by step ST21.

In the task 3, as described, a request for image data transfer by the editing part 11 interrupts retrieval of the image data for pasting icons successively in a window. The image data representing the requested frame images and the like are then sent to the editing part 11.

Figure 12:
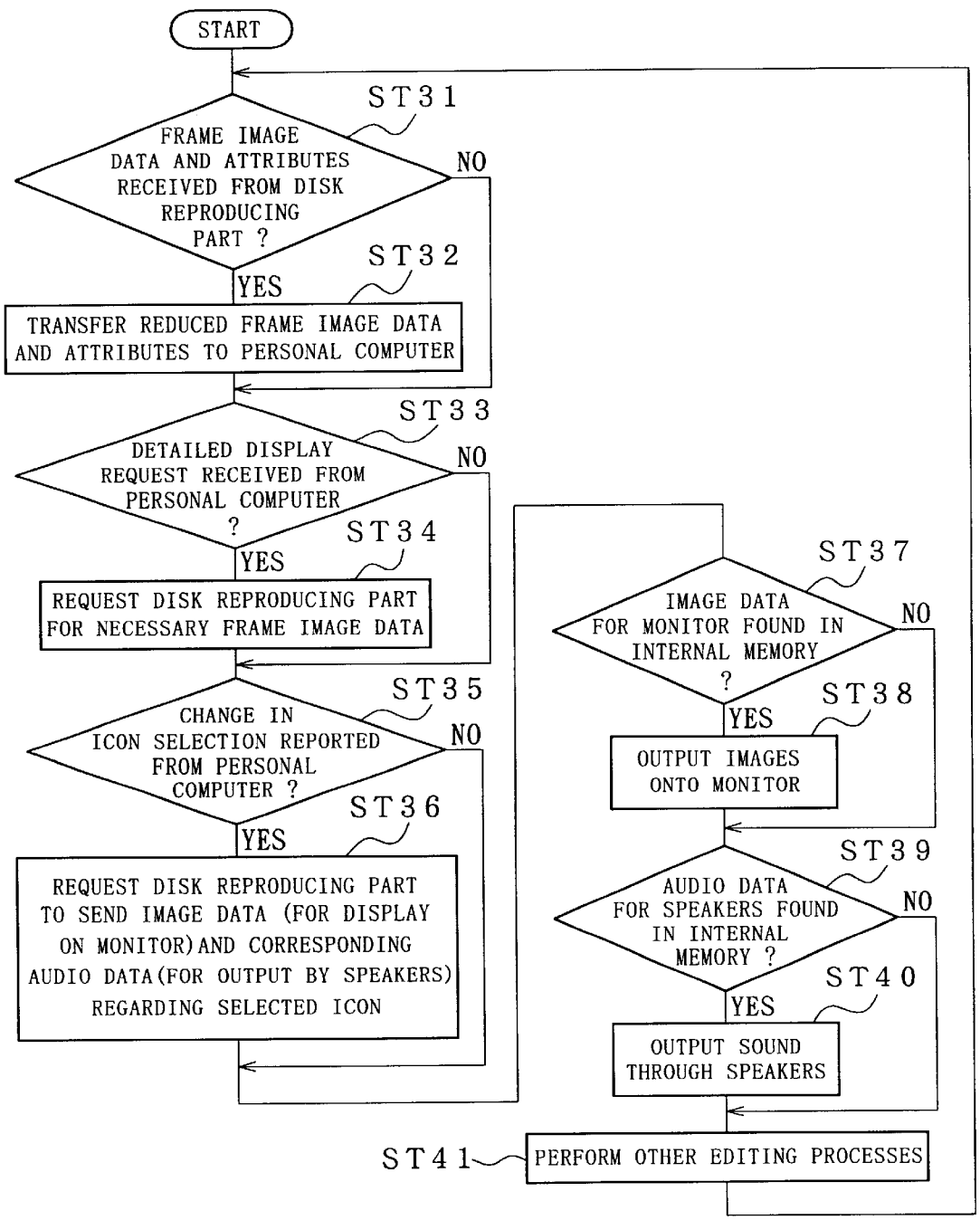
FIG. 12 is a flowchart of steps sketching operations of an editing part.

FIG. 12 is a flowchart of steps sketching operations of the editing part 11. In step ST31 of FIG. 12, a check is made to see if image data and their attribute information are received from the data reproducing part 12. If the image data and the attribute information are found to be supplied, step ST32 is reached. If the image data and the attribute information are not received, step ST33 is reached.

In step ST32, image data representing reduced images are created out of the supplied image data. The image data denoting the reduced images thus created and the related attribute information are sent to the computer 16. Step ST32 is followed by step ST33.

In step ST33, a check is made to see if a detailed display request is received from the computer 16. If such a request is received, step ST34 is reached. If no such request has been received, step ST35 is reached.

In step ST34, in accordance with the detailed display request from the computer 16, the data reproducing part 12 is supplied with a request for the transfer of the image data representing the necessary frame images. Step ST34 is followed by step ST35. Given the transfer request, the data reproducing part 12 reads successively the image data for a detailed display and sends the retrieved image data together with their attribute information to the editing part 11. The transferred image data and their attribute information are stored in an internal memory of the editing part 11. The editing part 11 carries out steps ST31 through ST41 (described later) in a cyclical manner. Since the image data and their attribute information are stored in its internal memory, the editing part 11 creates image data representing reduced images based on the stored image data when step ST31 is gain performed. The image data representing the reduced images are sent together with the stored attribute information to the computer 16.

In step ST35, the computer 16 checks to see if a new icon is selected. If a new icon is selected by operation of the mouse 18, step ST36 is reached. If no new icon is selected, step ST37 is reached.

In step ST36, the data reproducing part 12 is requested to transfer the image data associated with the newly selected icon and the audio data corresponding to the selected icon. Step ST36 is followed by step ST37.

In step ST37, a check is made to see if the image data requested in step ST36 are stored in the internal memory of the editing part 11. If the requested image data are found to be stored in the internal memory, step ST38 is reached. If the image data are not stored in the internal memory, step ST39 is reached.

In step ST38, the screen of the video monitor 13 displays images based on the image data stored in the internal memory. Step ST38 is followed by step ST39.

Steps ST31 through ST41 (described later) are performed cyclically until the necessary data are stored in the internal memory of the editing part 11. When the required data are stored in the internal memory, the processes in the steps ST36 and ST38 are carried out. If the data already stored in the internal memory are judged to be usable again, the processes in the steps ST36 and ST38 are performed immediately.

In step ST39, a check is made to see if audio data are stored in the internal memory of the editing part 11. If audio data are found to be stored, step ST40 is reached. If no such data are found, step ST41 is reached.

In step ST40, the speakers 14 output sound based on the audio data in the internal memory. Step ST40 is followed by step ST41. When the desired scene has been detected in the above-described fashion, various editing processes are carried out in step ST41. Then step ST31 is reached again.

Steps ST39 and ST40 are part of the process consisting of steps ST31 through ST41 carried out cyclically until necessary data are stored in the internal memory of the editing part 11. When the required data are stored in the internal memory, step ST39 is followed by step ST40 in which sound is output. Where the data already stored in the internal memory are judged to be usable again, step ST40 is immediately performed for audio output.

Figure 13:
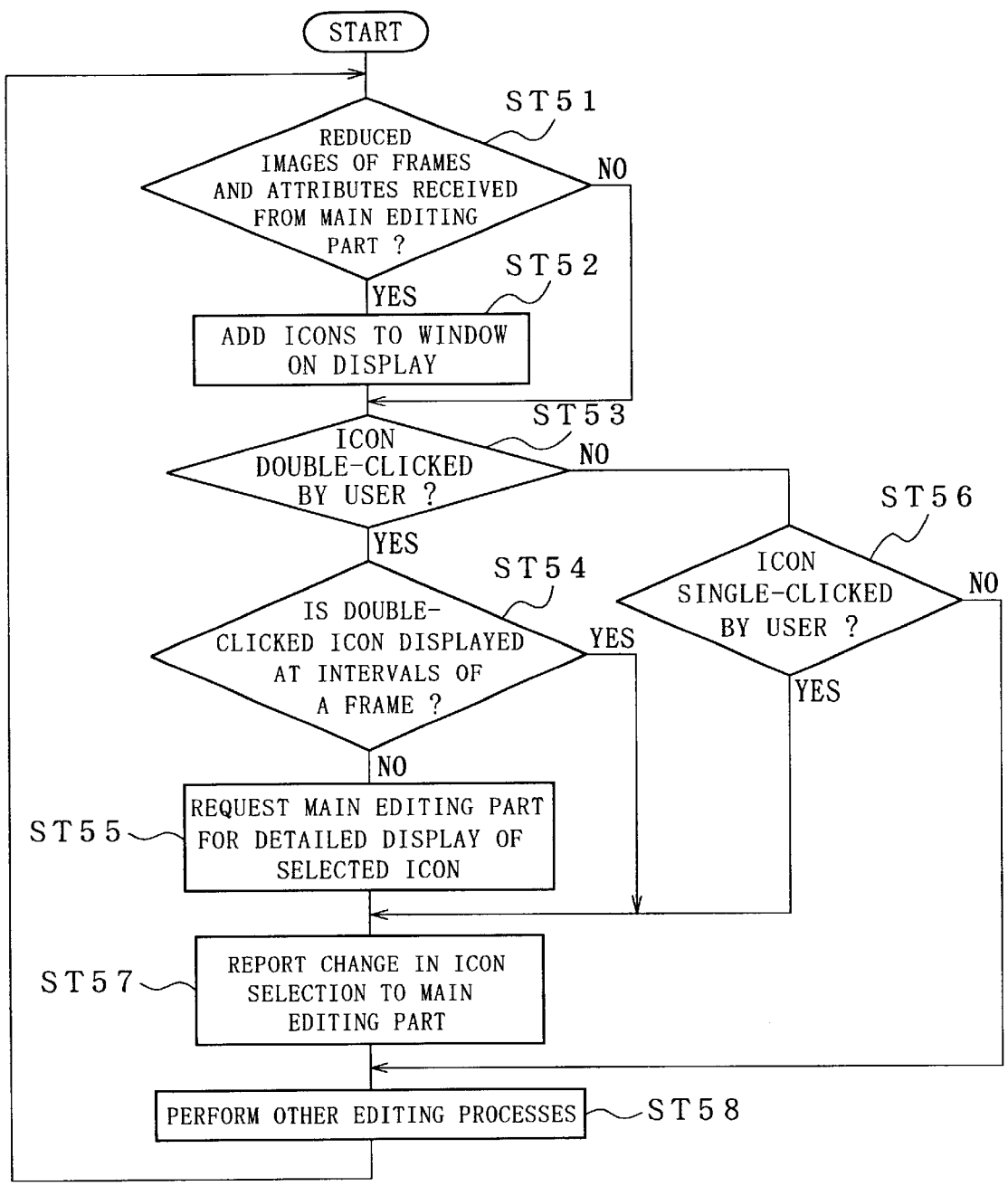
FIG. 13 is a flowchart of steps representing operations of a computer.

FIG. 13 is a flowchart of steps representing operations of the computer 16. In step ST51 of FIG. 13, a check is made to see if the image data representing reduced images and their attribute information are received from the editing part 11. If the image data and their attribute information are received from the editing part 11, step ST52 is reached. If the image data and their attribute information have not yet received, step ST53 is reached.

In step ST52, the reduced images thus supplied are pasted as icons in a window on the screen of the display device 19.

Step ST52 is followed by step ST53. The displayed icons are accompanied by their attribute information.

In step ST53, a check is made to see if the editor has selected an icon and double-clicked on the button of the mouse 18. If a double-click is performed, step ST54 is reached. If a double-click has not yet carried out, step ST56 is reached.

In step ST54, a check is made to see if the double-clicked icon is one of frame icons displayed at intervals of a frame. If the icon in question is found to be such a frame icon that displays continuously at intervals of a frame, step ST57 is reached. If the icon turns out to be another kind of frame icon, step ST55 is reached.

In step ST55, the editing part 11 is requested to make a detailed display based on the selected icon because double-clicked icon is not displayed in detail at intervals of a frame. Step ST55 is followed by step ST57.

If a double-click is not carried out in step ST53, step ST56 is reached. In step ST56, a check is made to see if the editor has single-clicked the button of the mouse 18. If a single-click is performed in step ST56, step ST57 is reached. If a single-click has not yet carried out, step ST58 is reached.

In step ST57, the editing part 11 is notified of a different icon that is selected. Step ST57 is followed by step ST58. Given the notice in step ST57, the editing part 11 repeats the above processes starting from step ST36. That is, with the relevant data stored in the internal memory, a nonreduced image of the selected icon is displayed on the screen of the video monitor 13. Concurrently, the speakers 14 output the sound corresponding to the image displayed on the video monitor 13. The image appearing on the video monitor 13 allows the editor readily to determine whether or not the selected image is what is desired.

When the desired scene is thus detected, various editing processes are performed in step ST58 by the editing part 11 under control of the computer 16. Step ST58 is followed by step ST51.

If the data reproducing part 12 is a fixed disc drive, the processes shown in FIGS. 9 through 13 are still carried out in like manner.

As described, the inventive method and apparatus as embodied above allow the screen of the display device 19 to display icons of video clips representing images recorded in the data reproducing part 12. Because the video clip icons are displayed hierarchically, any desired scene is reached easily by simply selecting one appropriate icon after another and by requesting a more detailed display of each selected icon. This permits efficient, time-saving execution of editing work.

Although the above-described embodiments have been shown displaying frame icons at intervals of 15 seconds and 15 frames, the intervals may be changed as desired by the editor. Such display of icons at customized intervals will further enhance the efficiency of editing processes.

Industrial Applicability

As described, the image displaying method and editing apparatus according to the invention are used advantageously to edit images of a temporally continuous material. In particular, the inventive method and apparatus are suited for the retrieval of desired scenes from temporally continuous material images.

What is claimed is:

1. An image displaying method comprising the steps of:

displaying one video clip or a plurality of video clips of temporally continuous material images on a screen as a first image group in a first window on said screen;

displaying in a second window, concurrently with said first window, on said screen, when one of said video clips is selected from said first image group to request for a more detailed display of the selected video clip, image extracted at an interval of a first time period from the temporally continuous material images constituting said selected video clip as a second image group;

displaying in a third window, concurrently with said first and second window, on said screen, when one image is selected from said second image group to request for a more detailed display of the selected image, image extracted at an interval of a second time period shorter than that of said first time period as a third image group, said image occurring over a time period before and after, before, or after the selected image within said second image group;

then displaying on said screen, when one image is further selected from the image group displayed on said screen to request for a more detailed display of the selected image, image extracted relative to said selected image from said temporally continuous material images at an interval of a time period shorter than that of said image group including the selected image; and displaying on said screen, when one image is selected from an N-th image group to request for a more detailed image of the selected image, continuous material images occurring over a time period before and after, before, or after the selected image within said N-th image group.

2. The image displaying method according to claim 1, further comprising a step of:

when any one of the images on said screen is selected, then outputting audio data corresponding to the selected image for a predetermined period of time.

3. The image displaying method according to claim 1, further comprising a step of:

when a new storage medium on which temporally continuous material images is recorded is used, then automatically displaying on said screen, images of at least up to said second image group based the material recorded on said recording medium.

4. The image displaying method according to claim 1, further comprising a step of:

when one video clip is selected from said first image group to request for a more detailed display of the selected video clip, then displaying on said screen, as said second image group, the first and the last of the temporally continuous material images constituting said selected video clip as well as images extracted therefrom at intervals of said first time period.

5. The image displaying method according to claim 1, wherein image displayed on said screen is reduced image.

6. An editing apparatus comprising:

a data reproducing part for reproducing a temporally continuous material to acquire a reproduced signal;

an editing part for performing editing process using said reproduced signal acquired by said data reproducing part and for creating reduced image of said material;

display device for displaying a plurality of reduced images of the material created by said editing part;

an inputting part for selecting any one of said reduced images displayed on a screen of said display device; and a controlling part for controlling said data reproducing part and said editing part, when any one of the images currently displayed on said display device is selected by said inputting part to request for a more detailed display of the selected image, to allow said display device to display reduced images of the image extracted relative to said selected image from said temporally continuous material at intervals of a time period shorter than that of the reduced images displayed currently on said display.

7. The editing apparatus according to claim 6, further comprising a video monitor;

wherein, when the image displayed on said display screen is selected by said inputting part, said controlling part controls said data reproducing part and said editing part to allow video monitor to display the selected material image in a nonreduced format on the screen thereof.

8. The editing apparatus according to claim 6, further comprising an audio outputting part;

wherein, when the image displayed on the display screen is selected by said inputting part, said controlling part controls said data reproducing part and said editing part to allow said audio outputting part to output audio data corresponding to the selected image therefrom for a predetermined period of time.

9. The editing apparatus according to claim 6, wherein said data reproducing part reproduces materials recorded on a removable storage medium; and wherein, when a new storage medium is used in said data reproducing part, said controlling part controls said data reproducing part and said editing part to allow the display device to display on the screen thereof one video clip or a plurality of video clips of the temporally continuous material images recorded on said new storage medium and also to display the first and the last of said temporally continuous material images constituting of said video clip as well as reduced images of the images extracted at an interval of a predetermined time period.

\* \* \* \* \*